(12) United States Patent
Shimono et al.

(10) Patent No.: US 8,409,653 B2
(45) Date of Patent: Apr. 2, 2013

(54) SALTY TASTE ENHANCER AND FOOD OR DRINK CONTAINING THE SAME

(75) Inventors: Masashi Shimono, Hachioji (JP); Kiminori Sugiyama, Hachioji (JP)

(73) Assignee: Nippon Suisan Kaisha, Ltd., Tokyo (JP)

( * ) Notice: Subject to any disclaimer, the term of this patent is extended or adjusted under 35 U.S.C. 154(b) by 133 days.

(21) Appl. No.: 12/922,620

(22) PCT Filed: Mar. 11, 2009

(86) PCT No.: PCT/JP2009/054609
§ 371 (c)(1), (2), (4) Date: Nov. 8, 2010

(87) PCT Pub. No.: WO2009/113563
PCT Pub. Date: Sep. 17, 2009

(65) Prior Publication Data
US 2011/0064861 A1 Mar. 17, 2011

(30) Foreign Application Priority Data
Mar. 14, 2008 (JP) ............................. P.2008-066830

(51) Int. Cl.
A23L 1/304 (2006.01)
A23L 1/305 (2006.01)

(52) U.S. Cl. ........ 426/650; 426/649; 426/652; 426/655; 426/656

(58) Field of Classification Search .................. 426/649, 426/650, 652, 655, 656
See application file for complete search history.

(56) References Cited

U.S. PATENT DOCUMENTS

| | | | |
|---|---|---|---|
| 5,000,977 | A | 3/1991 | Marggrander et al. |
| 5,145,707 | A | 9/1992 | Lee |
| 5,711,985 | A | 1/1998 | Guerrero et al. |
| 6,159,529 | A | 12/2000 | Uchida et al. |
| 6,974,597 | B2 | 12/2005 | Ohta et al. |
| 2003/0091721 | A1 | 5/2003 | Ohta et al. |
| 2003/0099760 | A1 | 5/2003 | Okai et al. |
| 2011/0027451 | A1 | 2/2011 | Shimono et al. |

FOREIGN PATENT DOCUMENTS

| | | |
|---|---|---|
| EP | 0 608 712 | 8/1994 |
| EP | 0 677 249 | 10/1995 |
| EP | 1 080 645 | 3/2001 |
| EP | 1163853 | 12/2001 |
| JP | 71010898 | 7/1967 |
| JP | 58-193676 | 11/1983 |
| JP | 61-115464 | 6/1986 |
| JP | 63-3766 | 1/1988 |
| JP | 63-137658 | 6/1988 |
| JP | 4-108358 | 4/1992 |
| JP | 7-289198 | 11/1995 |
| JP | 10-66540 | 3/1998 |
| JP | 11-187841 | 7/1999 |
| JP | 2000-37170 | 2/2000 |
| JP | 2003-144088 | 5/2003 |
| WO | 01/39613 | 6/2001 |
| WO | 2007/045566 | 4/2007 |
| WO | WO 2007/042274 | 4/2007 |
| WO | 2007/055393 | 5/2007 |

OTHER PUBLICATIONS

Nakata, et al., "Role of Basic and Acidic Fragments in Delicious Peptides (Lys-Gly-Asp-Glu-Glu-Ser-Leu-Ala) and the Taste Behavior of Sodium and Potassium Salts in Acidic Oligopeptides", Biosci. Biotech. Bilchem, 1995, vol. 59, No. 4, pp. 689-693.

International Search Report issued in Application No. PCT/JP2009/054609, mailed May 26, 2009—5 pages.

Shimono, et al., co-pending U.S. Appl. No. 12/934,028, filed Sep. 22, 2010—33 pages.

Nakata, et al., "Role of Basic and Acidic Fragments in Delicious Peptides (Lys-Gly-Asp-Glu-Glu-Ser-Leu-Ala) and the Taste Behavior of Sodium and Potassium Salts in Acidic Oligopeptides", Biosci. Biotech. Biochem, 1995, vol. 59, No. 4, pp. 689-693.

*Primary Examiner* — Halen F Heggestad
(74) *Attorney, Agent, or Firm* — Hamre, Schumann, Mueller & Larson, P.C.

(57) ABSTRACT

It is possible to provide an excellent salty taste enhancer that can compensate for insufficient salty taste when attempting to reduce the salt content of a food. A salty taste enhancer obtained by adding a glutamic acid-containing dipeptide, specifically Glu-Ala, Glu-Arg, Glu-Asn, Glu-Asp, Glu-Gln, Glu-Glu, Glu-Gly, Glu-His, Glu-Ile, Glu-Leu, Glu-Lys, Glu-Pro, Glu-Ser, Glu-Thr, Glu-Trp, Glu-Tyr, Glu-Val, Arg-Glu, Asn-Glu, Asp-Glu, Gln-Glu, His-Glu, Pro-Glu, Ser-Glu, Thr-Glu, or Trp-Glu, to an enzymatic decomposition product of a protein material and/or a basic amino acid, especially arginine. A method for producing these salty taste enhancers, a method for enhancing a salty taste by using these salty taste enhancers, and a food or drink that contains these salty taste enhancers.

9 Claims, 3 Drawing Sheets

SALTY TASTE ENHANCER AND FOOD OR DRINK CONTAINING THE SAME

TECHNICAL FIELD

The present invention relates to a salty taste enhancer for compensating for a weak or insufficient salty taste in foods and drinks having a reduced common salt content, a method for enhancing salty taste by using this salty taste enhancer, and a food or drink that contains this salty taste enhancer.

BACKGROUND ART

Common salt (sodium chloride) is an indispensable nutrient for human beings. For example, common salt plays an important role in regulating the water content and pH of the body, digesting food, nutrient absorption, neurotransmission, and so on. Furthermore, common salt plays an important role in influencing the flavor of foods and drinks. For example, common salt enhances deliciousness and flavor, preserves food, facilitates the production of fermented foods such as miso (fermented soybean paste), soy sauce and bread, imparts texture to paste products and udon (thick wheat flour noodle) noodles, and preserves the color of chlorophyll through stabilization. Therefore, common salt is indispensable for human life, but it is thought that ingesting excessive quantities of common salt raises the risk of conditions such as hypertension, kidney disease and heart disease, although there are a number of views on this. As a result, much importance has been placed on the quantity of common salt ingested, and especially the quantity of sodium ingested, and the reduction of this intake has become a matter of concern. This is not only in order to treat diseases that have already occurred, but also to provide means for preventing healthy people from developing diseases.

In order to reduce the quantity of common salt ingested, one method that has been considered is simply to reduce the quantity of common salt used when seasoning or processing food, but because common salt plays an important role in the flavor of foods, as mentioned above, foods and drinks which simply have reduced quantities of common salt lose flavor and become bland. Therefore, there is a strong demand for the development of a technique that does not diminish the salty taste and flavor of a food or drink having reduced common salt content.

One conventional method for reducing the common salt content of a food or drink without diminishing salty taste or flavor was to use a substance that had an inherent salty taste, that is, use of a common salt alternative. For example, potassium salts such as potassium chloride, ammonium salts such as ammonium chloride and magnesium salts such as magnesium chloride are known as typical common salt alternatives. Furthermore, amino acid hydrochlorides such as glycine ethyl ester hydrochloride and lysine hydrochloride and peptides comprising basic amino acids such as ornithyltaurine, ornithyl-β-alanine and glycyl lysine are also known as common salt alternatives. These salty taste alternatives have the drawback of imparting a bitter, peculiar, or unpleasant taste in addition to a salty taste. As techniques for using these salty taste alternatives to reduce the quantity of common salt used and suppress flavors other than the salty taste that are unpleasant, a seasoning composition obtained by blending specific proportions of potassium chloride, ammonium chloride, calcium lactate, sodium L-aspartate, an L-glutamate and/or a nucleic acid-based taste substance (Patent document 1), and a method for removing the bitter taste of potassium chloride by combining with a calcium salt or magnesium salt of an organic acid (Patent document 2) are known. However, a salt reduction technique that meets users' needs has yet to be achieved for reasons such as the presence of unpleasant tastes in addition to the salty taste and the strength of the salty taste being low.

Furthermore, another method for reducing the quantity of common salt used in a food or drink without impairing salty taste or flavor is to use a substance that enhances salty taste and does not impair salty taste even when the quantity of common salt is reduced, that is, use a salty taste-enhancing substance. There have been many reports of such substances, such as a combination of L-arginine, L-aspartic acid and sodium chloride (Patent document 3), a peptide having a molecular weight of 50,000 Daltons or lower obtained by hydrolyzing collagen (Patent document 4), thaumatin (Patent document 5), protein hydrolysates of various protein materials (Patent document 6), trehalose (Patent document 7), yeast extract (Patent document 8), a peptide obtained by subjecting a protein to hydrolysis and deamidation (Patent document 9) and a taste improver having, as a primary component, a neutral salt obtained by reacting a basic amino acid with citric acid (Patent document 10). However, from the perspectives of common salt reduction effect, flavor, economy and the like, an effective technique that meets consumer demands has yet to be achieved, and there is still a strong need for an effective common salt reduction technique that does not impair salty taste or flavor even when the quantity of common salt used is reduced.

Patent document 1: Japanese Unexamined Patent Application Publication No. H11-187841
Patent document 2: Japanese Unexamined Patent Application Publication No. H04-108358
Patent document 3: U.S. Pat. No. 5,145,707
Patent document 4: Japanese Unexamined Patent Application Publication No. S63-3766
Patent document 5: Japanese Unexamined Patent Application Publication No. S63-137658
Patent document 6: Japanese Unexamined Patent Application Publication No. H07-289198
Patent document 7: Japanese Unexamined Patent Application Publication No. H10-66540
Patent document 8: Japanese Unexamined Patent Application Publication No. 2000-37170
Patent document 9: Publication of the International Application in Pamphlet No. 01/039613
Patent document 10: Japanese Unexamined Patent Application Publication No. 2003-144088

DISCLOSURE OF THE INVENTION

Problems that the Invention is to Solve

An object of the present invention is to provide a salty taste enhancer for complementing a weak or insufficient salty taste in foods and drinks having a reduced common salt content, a method for producing this salty taste enhancer, a method for enhancing a salty taste by using this salty taste enhancer, and a food or drink that contains this salty taste enhancer.

Means for Solving the Problems

By investigating the salty taste enhancement effect of enzymatic decomposition products of proteins, the inventors of the present invention found that of many decomposition products, dipeptides, and especially dipeptides containing at least one glutamic acid (Glu) unit as a constituent amino acid, exhibited a strong effect, and thereby completed the present invention.

The present invention is outlined via the following salty taste enhancers (1) to (9).

(1) A salty taste enhancer containing, as an active ingredient, a dipeptide containing at least one glutamic acid (Glu) unit as a constituent amino acid.

(2) The salty taste enhancer described in (1), in which the dipeptide containing at least one glutamic acid (Glu) unit as a constituent amino acid is a dipeptide selected from among the group containing Glu-Ala, Glu-Arg, Glu-Asn, Glu-Asp, Glu-Gln, Glu-Glu, Glu-Gly, Glu-His, Glu-Ile, Glu-Leu, Glu-Lys, Glu-Pro, Glu-Ser, Glu-Thr, Glu-Trp, Glu-Tyr, Glu-Val, Arg-Glu, Asn-Glu, Asp-Glu, Gln-Glu, His-Glu, Pro-Glu, Ser-Glu, Thr-Glu, and Trp-Glu.

(3) The salty taste enhancer described in (1) or (2), which is a product obtained by subjecting a protein to enzymatic decomposition and then concentrating this enzymatic decomposition product so as to increase the concentration of the dipeptide containing at least one glutamic acid (Glu) unit as a constituent amino acid in a solid matter.

(4) The salty taste enhancer described in (3), in which the concentration treatment used to increase the dipeptide content is one or more treatments selected from among ethanol fractionation, ultrafiltration, cation exchange column treatment, activated charcoal column treatment, ODS column treatment, and silica gel column treatment.

(5) The salty taste enhancer described in any one of (1) to (4), which further contains an enzymatic decomposition product of a protein and/or a basic amino acid.

(6) The salty taste enhancer described in (5), in which the basic amino acid is arginine.

(7) The salty taste enhancer described in any one of (3) to (6), in which the enzymatic decomposition product of a protein is an enzymatic decomposition product of a protein selected from among the group containing proteins derived from the meat and/or internal organs of mammals, birds, fish and shellfish, or from grain or soy derived proteins.

(8) The salty taste enhancer described in any one of (1) to (7), which further contains potassium chloride.

(9) The salty taste enhancer described in any one of (1) to (8), wherein the pH is adjusted to a value of 5 to 8.

The present invention is essentialized in the following salty taste enhancement methods, foods and drinks, and methods for enhancing a salty taste enhancement effect.

(10) A method for enhancing a salty taste, wherein the salty taste enhancer described in any one of (1) to (9) is added to a common salt-containing food.

(11) A food or drink to which the salty taste enhancer described in any one of (1) to (9) is added.

(12) The food or drink described in (11), wherein the common salt content is lower than in conventional foods or drinks.

(13) A method for enhancing the salty taste enhancement effect of an enzymatic decomposition product of a protein by concentrating a dipeptide containing at least one glutamic acid unit in the enzymatic decomposition product of a protein.

Advantage of the Invention

Adding the salty taste enhancer of the present invention to a common salt-containing food has the effect of strongly enhancing the salty taste derived from common salt contained in the food. Therefore, by using the salty taste enhancer of the present invention, even if the quantity of common salt in a food item is reduced, it is possible to produce a salty taste equivalent to that before the quantity of common salt was reduced, and thus it is possible to reduce the quantity of common salt used.

BEST MODE FOR CARRYING OUT THE INVENTION

Figure 1:
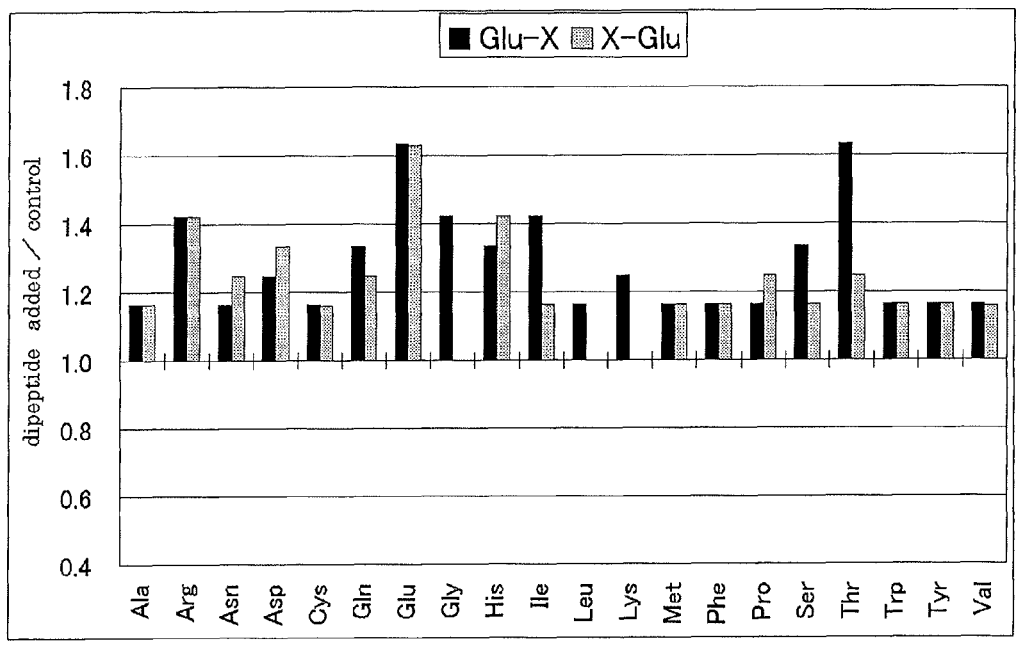
FIG. 1 shows the results of evaluations of the salty taste enhancement effect achieved when adding a variety of glutamic acid-containing dipeptides to an enzymatic decomposition product of bonito broth extract in Working Example 4.

The present invention relates to a salty taste enhancer containing, as an active ingredient, a dipeptide containing at least one glutamic acid unit as a constituent amino acid.

The dipeptide containing at least one glutamic acid unit as a constituent amino acid in the present invention is a dipeptide having a glutamic acid-amino acid structure or an amino acid-glutamic acid structure. Of these dipeptides, it was found that dipeptides selected from among the group containing Glu-Ala, Glu-Arg, Glu-Asn, Glu-Asp, Glu-Gln, Glu-Glu, Glu-Gly, Glu-His, Glu-Ile, Glu-Leu, Glu-Lys, Glu-Pro, Glu-Ser, Glu-Thr, Glu-Trp, Glu-Tyr, Glu-Val, Arg-Glu, Asn-Glu, Asp-Glu, Gln-Glu, His-Glu, Pro-Glu, Ser-Glu, Thr-Glu, and Trp-Glu exhibit a particularly strong effect. The dipeptide can be a synthetic compound or a dipeptide extracted and purified from a natural product. It is possible to use a dipeptide obtained by decomposing a protein with a proteolytic enzyme and then purifying. It is possible to use the below-mentioned enzymatic decomposition products as this protein decomposition product. These may be a single highly purified dipeptide, a mixture of a plurality of dipeptides, or in a form that contains amino acids or tripeptides. The purity of the dipeptide should be such that the required quantity thereof is able to be added. If the added quantity of the dipeptide needs to be reduced on account of the food to which the dipeptide is being added, a high degree of dipeptide purification should be carried out, but when using the dipeptide in a food in which the tastes or flavors of ingredients other than the dipeptide have no effect, a low degree of dipeptide purity is acceptable. In order to increase the concentration of the hydrophilic glutamic acid-containing dipeptide in the enzymatic decomposition product of the protein, it is possible to carry out the concentration by, for example, carrying out treatment that removes free amino acids, treatment that removes high molecular weight proteins and long chain peptides, treatment that separates hydrophobic peptides from hydrophilic peptides or treatment that separates basic peptides from acidic peptides, such as the ethanol fractionation, ultrafiltration, cation exchange column treatment, activated charcoal column treatment, ODS column treatment, and silica gel column treatment described in Working Example 7. It is preferable to concentrate the enzymatic decomposition product of a protein at least two-fold, and more preferably at least four-fold, by using the treatments mentioned above. By concentrating in this way, unwanted components are removed, odd flavors, and coarse flavors are eliminated, usability is improved in comparison with unconcentrated enzymatic decomposition products or proteins, and the added quantity of the enzymatic decomposition product of a protein can be reduced.

As shown in Working Example 5, the dipeptide of the present invention does not exhibit a salty taste enhancement effect when used alone, but does exhibit the effect when used in combination with arginine or an enzymatic decomposition product of a protein. Because most foods, and especially protein-containing foods, contain a variety of amino acids and peptides, like arginine and the like, it is possible to achieve a salty taste enhancement effect in such foods simply by adding the dipeptide of the present invention.

The dipeptide-containing salty taste enhancer of the present invention may further contain an enzymatic decomposition product of a protein.

In the present invention, animal protein means a protein derived from the meat or internal organs of domestic animals, poultry, fish or shellfish or a protein derived from milk, eggs or the like. Specifically, it is possible to use a variety of animal-derived proteins, such as beef extract, chicken extract, pork extract, fish extract, casein, gelatin, or egg albumen. Fish and shellfish extracts are particularly preferred. Bonito extract, milt extract, conger eel extract, lizardfish extract, tuna extract, scallop extract, hill extract, cod roe extract and the like can be cited as examples thereof. It is also possible to use broths produced during canning processes.

In the present invention, plant protein means a protein obtained from cereals, vegetables and the like. Specifically, it is possible to use a variety of plant-derived proteins obtained by processing soy beans, wheat, corn, rice or the like. It is preferable to use a soy protein isolate, soy milk protein, concentrated soy protein, defatted soy protein, wheat gluten, corn gluten, or the like.

In the present invention, enzymatic decomposition product means a product obtained by decomposing the above-mentioned animal proteins and plant proteins into a mixture of amino acids and peptides by means of an enzyme. It is possible to use a variety of proteolytic enzymes. Because the proteins should be substantially decomposed by the enzyme, a decomposition product obtained by fermentation and the like may be used.

The protein hydrolase may be an endopeptidase or an exopeptidase, and one of more types thereof may be used. The endopeptidase may be, for example, a serine protease such as trypsin, chymotrypsin or subtilisin, an aspartic acid protease such as pepsin, a metal protease such as thermolysin, or a cysteine protease such as papain. Endopeptidases that are commercially available as food additives include ALCALASE (a protease produced by Novozymes), NEUTRASE (a protease produced by Novozymes), NUCLEICIN (a protease produced by HBI), SUMITEAM MP (a protease produced by Shin Nihon Chemicals Corporation), BROMELAIN F (a protease produced by Amano Enzyme Inc.), ORIENTASE 20A (a protease produced by HBI), MOLSIN F (a protease produced by Kikkoman Corporation), NEWLASE F (a protease produced by Amano Enzyme Inc.) and SUMITEAM AP a protease (produced by Shin Nihon Chemicals Corporation).

In addition, enzymes having exopeptidase activity that are commercially available as food additives include FLAVORZYME (an exopeptidase produced by Novozymes), SUMITEAM FP (an exopeptidase produced by Shin Nihon Chemicals Corporation), ACTINASE (an exopeptidase produced by Kaken Pharmaceutical Co., Ltd.) and KOKULASE P (an exopeptidase produced by Genencor). In addition, it is possible to use a combination of two or more of these protein-hydrolyzing enzymes. These enzymes are preferably reacted with the raw materials for 1 to 48 hours, and especially 3 to 24 hours, under suitable conditions of pH and temperature. An enzymatic decomposition product obtained in this way may be used without further modification. Moreover, these enzymatic decomposition products are preferably decomposed so as to have an average peptide chain length of 2 to 3, as determined by the TNBS method.

The dipeptide-containing salty taste enhancer of the present invention may further contain a basic amino acid. In such cases, the basic amino acid used is preferably arginine. It is possible to use commercially available arginine or arginine purified using a routine method. If used in combination with an enzymatic decomposition product, the added quantity of the basic amino acid is preferably from 0.002 to 40 parts by weight, and especially preferably from 0.025 to 10 parts by weight, relative to 1 part by weight of the active ingredient of the enzymatic decomposition product (the quantity of active ingredient is obtained by subtracting the quantity of sodium chloride from the Brix value of the enzymatic decomposition product). In addition, the added quantity is preferably from 0.005 to 400 parts by weight, and especially preferably from 0.05 to 100 parts by weight, relative to 1 part by weight of the dipeptide. It is possible to further blend potassium chloride in the salty taste enhancer. Commercially available potassium chloride may be used. The added quantity of potassium chloride is preferably from 0.002 to 100 parts by weight, and especially preferably from 0.05 to 20 parts by weight, relative to 1 part by weight of the active ingredient of the enzymatic decomposition product. In addition, the added quantity of potassium chloride is preferably from 0.005 to 1000 parts by weight, and especially from 0.1 to 200 parts by weight, relative to 1 part by weight of the dipeptide.

The added quantity of the dipeptide is preferably from 0.001 to 40 parts by weight, and especially from 0.005 to 10 parts by weight, relative to 1 part by weight of the active ingredient of the enzymatic decomposition product. In addition, the added quantity of the dipeptide is preferably from 0.0025 to 200 parts by weight, and especially from 0.01 to 20 parts by weight, relative to 1 part by weight of arginine.

The salty taste enhancer of the present invention may be used at the pH of the decomposition products, but it is possible to exhibit an even greater effect by adjusting the pH value to the mildly acidic to neutral range, and specifically a pH range of from 5 to 8. The pH value of the enzymatic decomposition products is approximately neutral, but in cases where a basic amino acid such as arginine is added, the pH becomes alkaline, the pH should therefore be adjusted in such cases. The pH should be adjusted by means of a suitable acid, preferably citric acid, acetic acid, lactic acid, succinic acid, fumaric acid, phosphoric acid, or malic acid, and more preferably hydrochloric acid. The adjustment period can be at any time before the product is used and can be, for example, at the raw materials stage, during the production stage, or after the finished product has been obtained. Because many foods have approximately neutral pH values, it is possible to use the salty taste enhancer of the present invention without special treatment.

In addition, the present invention relates to a method for enhancing a salty taste by using the salty taste enhancer of the present invention. It is possible to enhance the salty taste of a food by adding the salty taste enhancer of the present invention, which is obtained using the aforementioned method, to a common salt-containing food. The quantity of salty taste enhancer added depends on the type of food, but by adding from 0.1 to 0.4 wt. % of the dipeptide of the present invention, from 1 to 2 wt. % of the active ingredient of the enzymatic decomposition product, from 0.1 to 1.0 wt. % of arginine and from 0.1 to 1.0 wt. % of potassium chloride to a food, it is possible to produce a similar salty taste even if the quantity of common salt in the food is reduced by 50%. Therefore, in cases where it is desired that the quantity of common salt (sodium chloride) in a food should be reduced by 50%, from 0.1 to 0.4 wt. % of the dipeptide, from 1 to 2 wt. % of the active ingredient of the enzymatic decomposition product, from 0.1 to 1.0 wt. % of arginine, and from 0.1 to 1.0 wt. % of potassium chloride should be added to the food, and the quantity of the salty taste enhancer of the present invention added should be increased or reduced according to the desired degree of common salt reduction. By adding the salty taste enhancer of the present invention in this way, it is possible to enhance the salty taste of a reduced salt food or drink.

In addition, by adding the salty taste enhancer of the present invention, which is obtained in this way, in order to reduce the salt content (the quantity of sodium chloride) in a variety of foods or drinks, it is possible to produce reduced salt foods or drinks. The salty taste enhancer of the present invention does not have a taste that greatly restricts the use of acridity, bitterness and so on, and can therefore be used in a wide variety of foods and drinks. These foods and drinks include processed seafoods such as salmon flakes, karashimentaiko (salted cod roe seasoned with salt and hot red pepper), salted cod roe, grilled fish, dried fish, salted fish products, fish sausage, fish paste, boiled fish, fish boiled in soy sauce, or canned foods, snacks such as potato chips, rice crackers or cookies, noodle soups/sauces such as udon (thick wheat flour noodle) soups, soba (thin wheat flour noodle) soups, somen (Japanese vermicelli) soups, ramen (Chinese noodle) soups, chanpon (mixed Chinese noodle) soups and pasta sauces, rice-based foods such as rice balls, pilaf, fried rice, mixed boiled rice, porridge of rice and vegetables and boiled rice with tea, prepared foods such as spring rolls, steamed dumplings, Chinese-style dumplings, curries, stews and fried foods, processed livestock products such as hamburgers, sausages, hams and cheeses, processed vegetable products such as kimchi (pickled cabbage) or Japanese pickles, seasonings such as soy sauce, sauces, dressings, miso (fermented bean paste), mayonnaise and tomato ketchup and soups such as consommé soups, clear soups, miso soup, and potage soups.

In addition, the salty taste enhancer of the present invention may be used in combination with a variety of publicly known and commercially available additives used in order to reduce the common salt content of foods and drinks.

The present invention will now be explained in greater detail through the use of working examples, but is in no way limited to these working examples.

Working Example 1

Methods of Analysis

1. Measurement of Common Salt Content

Common salt content was measured according to the following method. A sample was diluted 25 times in 1% HCl and shaken for 30 minutes to extract sodium ions, the extracted sample was diluted in an arbitrary quantity of 1% HCl, and sodium content was measured using an atomic absorption photometer (Z-2000, manufactured by Hitachi High Technologies). The common salt content was calculated by multiplying the obtained sodium content by 2.54.

2. Measurement of Active Ingredient Content

The active ingredient content of the salty taste enhancer of the present invention was determined by subtracting the common salt content from the Brix value of the products. Moreover, the Brix value was measured using a Brix meter (PAL-1, manufactured by Atago Co., Ltd.).

3. Measurement of Salty Taste Enhancement Effect (Salty Taste Enhancement Rate)

The salty taste strength of a sample solution adjusted so that the common salt concentration was 0.49% (w/w) was measured using a rating scale method. Specifically, the salty taste strength of a sample solution was compared with the salty taste strength of standard common salt solutions adjusted to concentrations of 0.49% (w/w), 0.625% (w/w), 0.76% (w/w) and 0.955% (w/w), and in cases where the salty taste strength of the sample solution linked the four concentration points of the standard common salt solutions in a straight line, the salty taste of the sample solution was evaluated by the position thereof on the straight line. The panel consisted of experts in the field of food and drink seasoning. In addition, the salty taste enhancement rate of the sample solution indicated the degree of enhancement relative to the salty taste strength of the 0.49% common salt solution, and was calculated according to the following formula.

$$\text{Salty taste enhancement rate } (\%) = \frac{\begin{pmatrix} \text{Common salt content derived} \\ \text{from sensory evaluation} \\ \text{results of sample solution } (\%) - 0.49 \end{pmatrix}}{0.49} \times 100 \qquad \text{[Formula 1]}$$

Working Example 2

Amino Acids, Dipeptides, Tripeptides

Amino acids, dipeptides and tripeptides having purities of 98% or higher were purchased from Wako Pure Chemical Industries, Ltd., BACHEM or AnyGen and used in the tests.

Working Example 3

Production of Enzymatic Decomposition Products Using a Variety of Protein Materials as Raw Materials 1. Production of Enzymatic Decomposition Product of Wheat Gluten Wheat gluten: 29.7 g of A-Glu-G (produced by Glico Foods Co., Ltd.) was made up to 200 g through dispersion in 0.6N HCl. This dispersion was treated for 120 minutes at 120° C. in an autoclave and, following the treatment, the reaction liquid was adjusted to a pH of 8.0 by means of 2N NaOH while checking the pH with a pH meter (F-50, manufactured by Horiba, Ltd.) and made up to 200 g with water. 1 g of ALCALASE 2.4 L (a protease produced by Novozymes) was added to the liquid and allowed to react for 6 hours in a water bath at 55° C. Following the reaction, the enzyme was deactivated by heating for 30 minutes at 95° C., and an enzymatic decomposition product of wheat gluten was obtained by subjecting the reaction liquid to centrifugal separation for 15 minutes at 7000 rpm (using a 50A-IV centrifugal separator manufactured by Sakuma) and then filtering (using a No. 2 filter paper produced by Advantec). Table 1 shows the Brix values and NaCl quantities.

2. Preparation of Enzymatic Decomposition Product of Bonito Broth Extract 5 kg of a diluted solution of bonito broth extract was prepared by adding 3 kg of water to 1 kg of bonito broth extract (NP-40, produced by Nippon Suisan Kaisha, Ltd.), adjusting the pH to 8.0 by means of 2N NaOH and then adding more water. 20 g of SUMITEAM MP (a protease produced by Shin Nihon Chemicals Corporation) was added to this diluted solution of bonito broth extract and allowed to react for 6 hours at 50° C. Following the reaction, the enzyme was deactivated by heating for 30 minutes at 95° C., and approximately 5 kg of an enzymatic decomposition product of the bonito broth extract was obtained by subjecting the reaction liquid to centrifugal separation for 15 minutes at 7000 rpm and then filtering. Table 1 shows the Brix values and NaCl quantities.

3. Production of Enzymatic Decomposition Product of Salmon Milt 1 kg of salmon milt (produced by Sasaya Shoten) was pulverized in a food cutter (manufactured by Dito Sama) and placed in a cooking pot, 2 kg of water was then added to the roe and heated for 30 minutes at 95° C. The pH was adjusted to 5.0 by means of 2N HCl and a further 3 kg of water was then added. 1 g of the nuclease "AMANO G" (a protease produced by Amano Enzyme Inc.), a nucleic acid-hydrolyzing enzyme, was added to the roe solution and heated for 5 hours at 70° C. in order to carry out hydrolysis. Following the reaction, the pH was adjusted to 6.0 by means of 2N NaOH, and 0.1 g of DEAMIZYME G (a deaminase produced by Amano Enzyme Inc.) was added and allowed to react for 24 hours at 50° C. Following this reaction, the pH was adjusted to 7.0 by means of 2N NaOH, 0.36 g of ALCALASE 2.4 L, which is a protein hydrolase, and 0.18 g of FLAVORZYME 1000 L/500 MG (an exopeptidase produced by Novozymes) were added and allowed to react for 24 hours at 50° C. Following the reaction, the enzyme was deactivated by heating for 30 minutes at 95° C., and approximately 2.8 kg of an enzymatic decomposition product of salmon milt was obtained by subjecting the reaction liquid to centrifugal separation for 15 minutes at 7000 rpm and then filtering. Table 1 shows the Brix values and NaCl quantities.

TABLE 1

| | material | Brix (%) | NaCl (%) | active ingredient (%) |
|---|---|---|---|---|
| example 3-1 | wheat gluten | 13.50 | 2.74 | 10.76 |
| example 3-2 | bonito broth extract | 19.75 | 3.73 | 16.02 |
| example 3-3 | salmon milt | 5.10 | 0.32 | 4.78 |

Working Example 4

Figure 2:
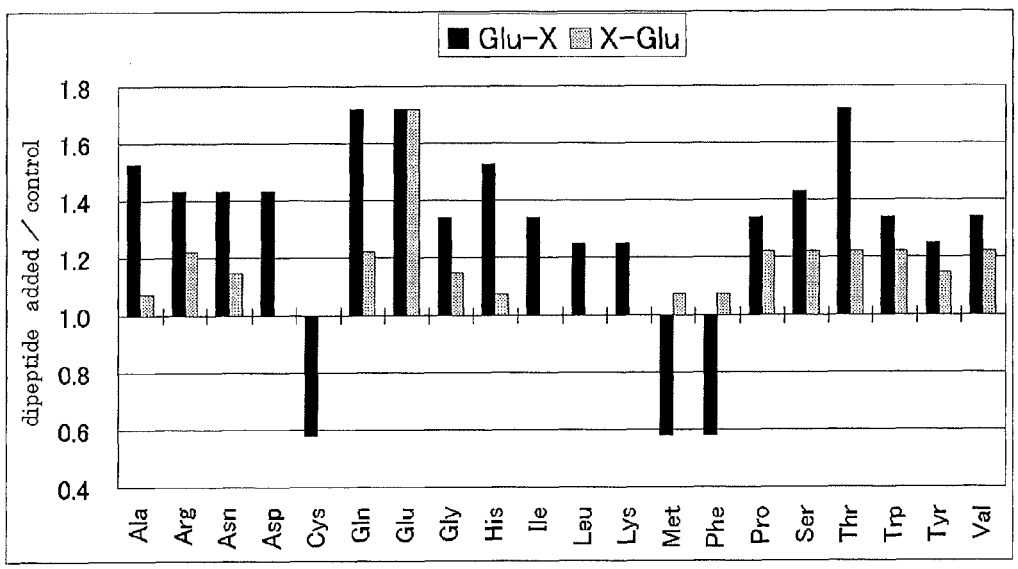
FIG. 2 shows the results of evaluations of salty taste enhancement effects achieved when adding a variety of glutamic acid-containing dipeptides to an enzymatic decomposition product of salmon milt in Working Example 4.
Figure 3:
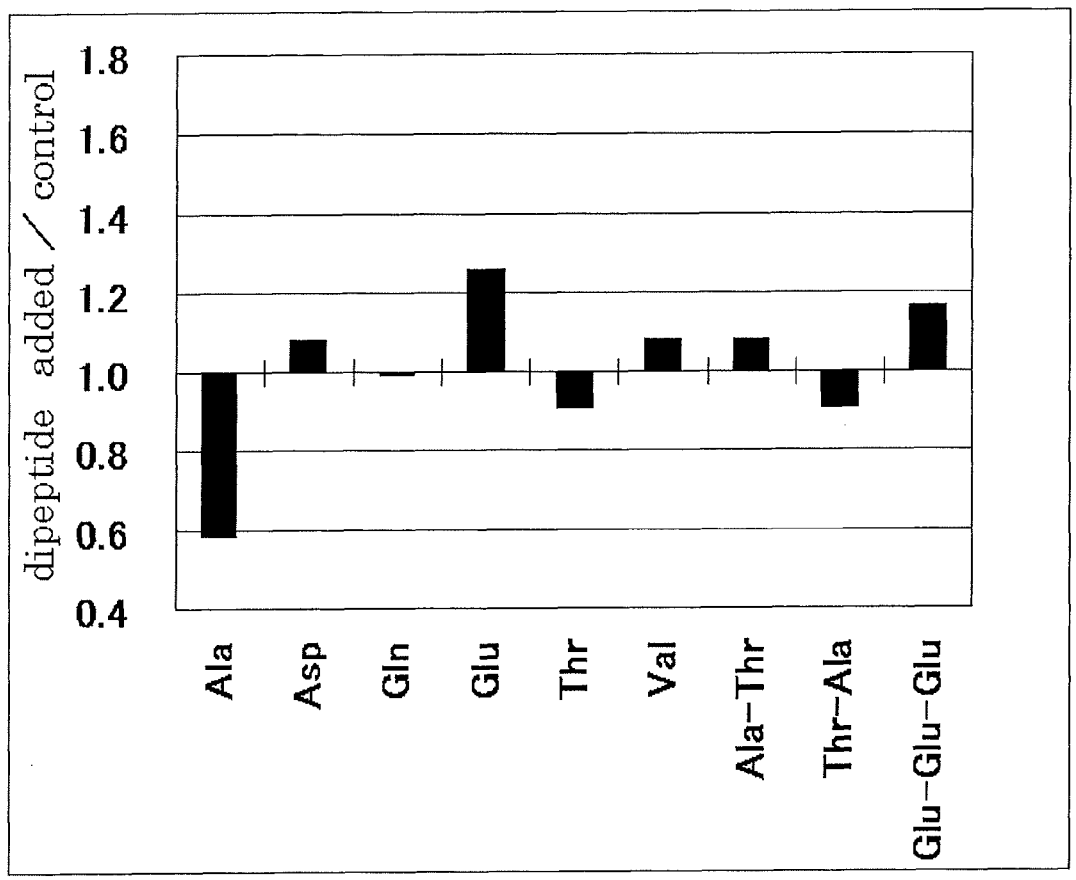
FIG. 3 shows the results of evaluations of salty taste enhancement effect achieved when adding a variety of amino acid, dipeptides and tripeptides to an enzymatic decomposition product of bonito broth extract in Working Example 4.

Evaluation of Enzymatic Decomposition Products to which Amino Acids, Dipeptides, and Tripeptides have been Added The amino acids, dipeptides and tripeptides prepared in Working Example 2 were added to the enzymatic decomposition product of bonito broth extract and enzymatic decomposition product of salmon milt prepared in Working Example 3 and then evaluated in terms of salty taste enhancement effect. Specifically, each enzymatic decomposition product was added in such a quantity that the active ingredient content thereof was 0.75 w/w %. Next, 10 w/w % aqueous solutions of the samples were added so that the concentrations of the amino acids, dipeptides, and tripeptides were 0.04 w/w %, the concentration of arginine was 0.70 w/w %, and the concentration of sodium chloride was 0.49 w/w %. Furthermore, evaluation liquids were obtained by adding 2N HCL in order to adjust the pH to 6.0 and then making up to 100 g with distilled water. Using these evaluation liquids, the effect of the salty taste enhancement effect was evaluated according to the rating scale method described in section 3 of Working Example 1. The results of the evaluations of salty taste enhancement effect obtained when adding glutamic acid-containing dipeptides to the enzymatic decomposition product of bonito broth extract are shown in FIG. 1, the results of the evaluations of salty taste enhancement effect obtained when adding glutamic acid-containing dipeptides to the enzymatic decomposition product of salmon milt are shown in FIG. 2, and the results of the evaluations of salty taste enhancement effect obtained when adding amino acids, dipeptides, and tripeptides to the enzymatic decomposition product of bonito broth extract are shown in FIG. 3. Moreover, the results are shown relative to a control, to which amino acids, dipeptides, and tripeptides were not added, this control being given a value of 1.0.

As can be seen from FIGS. 1 and 2, adding glutamic acid-containing dipeptides achieves a higher salty taste enhancement effect than the control, to which glutamic acid-containing dipeptides were not added. In particular, a trend was seen in which dipeptides having a glutamic acid at a carboxyl terminal end and a relatively hydrophilic amino acid at an amino terminal end exhibited a strong enzymatic decomposition product salty taste enhancement effect. Specifically, Glu-Ala, Glu-Arg, Glu-Asn, Glu-Asp, Glu-Gln, Glu-Glu, Glu-Gly, Glu-His, Glu-Ile, Glu-Leu, Glu-Lys, Glu-Pro, Glu-Ser, Glu-Thr, Glu-Trp, Glu-Tyr, Glu-Val, Arg-Glu, Asn-Glu, Asp-Glu, Gln-Glu, His-Glu, Pro-Glu, Ser-Glu, Thr-Glu, and Trp-Glu can be cited as examples thereof. As shown in FIG. 3, however, no significant improvement relative to the control in terms of the enzymatic decomposition product salty taste enhancement effect was seen with amino acids, dipeptides not containing glutamic acid, and tripeptides.

Working Example 5

Characteristics of the Salty Taste Enhancement Effect of Glu-Thr and Glu-Glu

An investigation of Glu-Thr and Glu-Glu was, which had a relative high salty taste enhancement effects, was carried out in Working Example 4. The evaluation liquid compositions are shown in Table 2. The pH of these evaluation liquids was adjusted to 6.0 by means of 2N HCl. The results of the evaluations of the salty taste enhancement effect of these solutions are shown in FIG. 4.

TABLE 2

| example | active ingredient of enzymatic decomposition product | | | Glu-Thr | Glu-Glu | Arg | NaCl |
| --- | --- | --- | --- | --- | --- | --- | --- |
| | example 3-1 | example 3-2 | example 3-3 | | | | |
| example 5-4 | — | — | — | 0.04% | — | 0.70% | 0.49% |
| example 5-5 | — | — | — | — | 0.04% | 0.70% | 0.49% |
| example 5-6 | 0.75% | — | — | — | — | — | 0.49% |
| example 5-7 | — | 0.75% | — | — | — | — | 0.49% |
| example 5-8 | — | — | 0.75% | — | — | — | 0.49% |
| example 5-9 | 0.75% | — | — | 0.04% | — | — | 0.49% |
| example 5-10 | — | 0.75% | — | 0.04% | — | — | 0.49% |
| example 5-11 | — | — | 0.75% | 0.04% | — | — | 0.49% |
| example 5-12 | 0.75% | — | — | — | 0.04% | — | 0.49% |
| example 5-13 | — | 0.75% | — | — | 0.04% | — | 0.49% |
| example 5-14 | — | — | 0.75% | — | 0.04% | — | 0.49% |
| example 5-15 | 0.75% | — | — | — | — | 0.70% | 0.49% |
| example 5-16 | — | 0.75% | — | — | — | 0.70% | 0.49% |
| example 5-17 | — | — | 0.75% | — | — | 0.70% | 0.49% |
| example 5-18 | 0.75% | — | — | 0.04% | — | 0.70% | 0.49% |
| example 5-19 | — | 0.75% | — | 0.04% | — | 0.70% | 0.49% |
| example 5-20 | — | — | 0.75% | 0.04% | — | 0.70% | 0.49% |
| example 5-21 | 0.75% | — | — | — | 0.04% | 0.70% | 0.49% |
| example 5-22 | — | 0.75% | — | — | 0.04% | 0.70% | 0.49% |
| example 5-23 | — | — | 0.75% | — | 0.04% | 0.70% | 0.49% |

Figure 4:
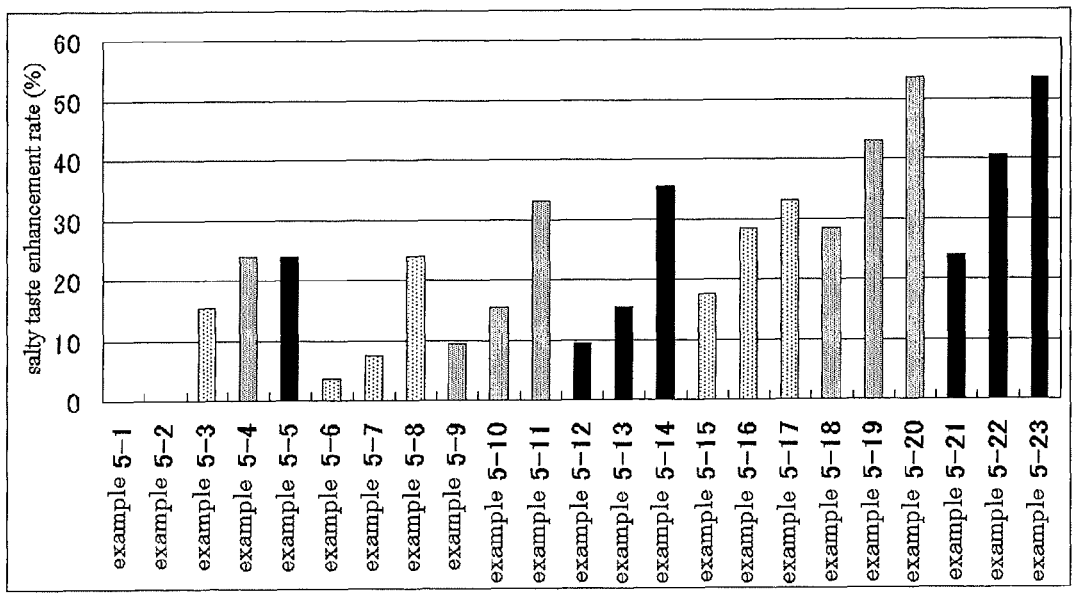
FIG. 4 shows the results of evaluations of the salty taste enhancement effects of Glu-Thr and Glu-Glu in Working Example 5.

As shown in FIG. 4, these results confirmed that using Glu-Thr alone or Glu-Glu alone did not exhibit a salty taste enhancement effect. It was confirmed that when these dipeptides were added to an enzymatic decomposition product and/or arginine, an increase in the salty taste enhancement effect of the dipeptides was seen.

Working Example 6

Added Quantity of Glu-Thr and Salty Taste Enhancement Effect

It was confirmed that there was a relationship between the added quantity of Glu-Thr and the salty taste enhancement effect. Specifically, samples were prepared in such a way that the concentration of Glu-Thr was 0.01, 0.04, 0.10, or 0.40%, the concentration of active ingredient of the enzymatic decomposition product of a bonito broth extract was 0.75%, the concentration of arginine was 0.35 or 0.70% and the concentration of sodium chloride was 0.49%. Furthermore, evaluation liquids were obtained by adding 2N HCL in order to adjust the pH to 6.0 and then making up to 100 g with distilled water. The results of the evaluations of the salty taste enhancement effects of these solutions are shown in FIG. 5.

Figure 5:
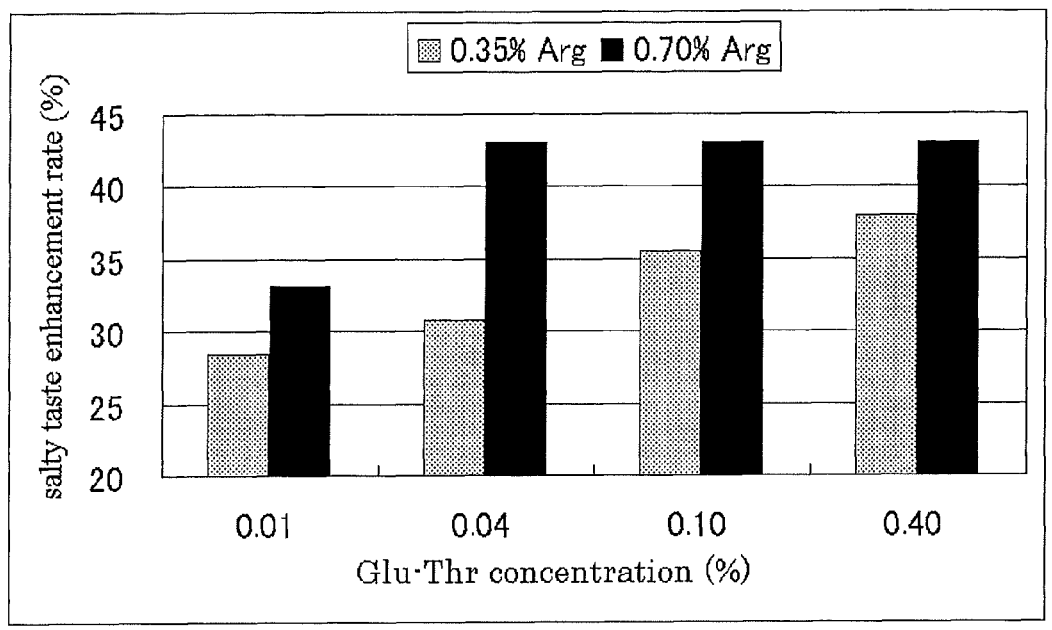
FIG. 5 shows the results of evaluations of the relationship between added quantity of Glu-Thr and salty taste enhancement effect in Working Example 6.

As can be seen from FIG. 5, these results show that a certain added quantity of Glu-Thr produced a satisfactory effect.

Working Example 7

Concentration of Glutamic Acid-Containing Dipeptides in Enzymatic Decomposition Products or Proteins The enzymatic decomposition product of bonito broth extract obtained in Working Example 3 was subjected to a series of treatments by which the glutamic acid-containing dipeptide was concentrated, from which it was confirmed that salty taste enhancement activity was maintained.

The salty taste enhancement effect was evaluated after adding the product of the concentration treatment at a quantity corresponding to 2% of active ingredient calculated in terms of the enzymatic decomposition product of bonito broth extract, which is the raw material prior to the concentration treatment, to a solution containing 0.75% of the active ingredient of the enzymatic decomposition product of bonito broth extract obtained in Working Example 3, 0.49% of sodium chloride and 0.70% of arginine, adjusting the pH to 6.0 by means of 2N HCl and then making up to 100 g with distilled water so as to obtain an evaluation liquid. A liquid to which the product of the concentration treatment was not added was used as a control.

(1) Ethanol Fractionation

To a quantity of the enzymatic decomposition product of bonito broth extract, 4 times this quantity of ethanol was added. The mixture was left to stand for 2 hours at −20° C. and then subjected to centrifugation so as to separate the mixture into a supernatant fraction and a precipitation fraction. The obtained fractions were evaporated to dryness in a vacuum and then dissolved in distilled water.

(2) Ultrafiltration

The precipitation fraction obtained in the above-mentioned ethanol fractionation was separated into a fraction having a molecular weight of 3000 by means of an ultrafiltration membrane (manufactured by Millipore). Fractions having molecular weights of both greater than or equal to and less than or equal to 3000 were obtained thereby.

(3) Cation Exchange Column Treatment

The fraction having a molecular weight of 3000 or lower obtained by means of the above-mentioned ultrafiltration was diluted with 0.5N hydrochloric acid so that the active ingredient concentration therein was 1%, charged in a Dowex 50 W×4 column (200 to 400 mesh, H+ type, manufactured by Muromachi Technos Co., Ltd.) and washed with a quantity of distilled water equivalent to five times the capacity of the column so as to isolate the unadsorbed fraction. The adsorbed fraction was eluted with a quantity of a 2N ammonia solution equivalent to five times the capacity of the column. The obtained fractions were evaporated to dryness in a vacuum and then dissolved in distilled water.

(4) Activated Charcoal Column Treatment

The adsorbed fraction obtained from the above-mentioned cation exchange column treatment was charged in an activated charcoal (produced by Futamura Chemical Co., Ltd.) column and washed with a quantity of distilled water equivalent to five times the capacity of the column so as to isolate the unadsorbed fraction. The adsorbed substances were sequentially eluted with quantities of 10% and 50% acetone solutions equivalent to five times the capacity of the column. The obtained fractions were evaporated to dryness in a vacuum and then dissolved in distilled water.

(5) ODS Column Treatment

The unadsorbed fraction obtained from the above-mentioned activated charcoal column treatment was adjusted to a pH of 3.0 by means of 2N HCl, concentrated to a volume equivalent to one fiftieth of the capacity of the column, charged in a C18-OPN column (manufactured by Nacalai Tesque), and separated into fractions each having a volume equivalent to the capacity of the column by using a volume of distilled water equivalent to 3 times the capacity of the column as the eluant, and the adsorbed substances were sequentially eluted with quantities of 10% and 50% ethanol solutions equivalent to five times the capacity of the column. The obtained fractions were evaporated to dryness in a vacuum and then dissolved in distilled water.

(6) Silica Gel Column Treatment

The distilled water-eluted fraction obtained from the above-mentioned ODS column treatment was evaporated to dryness in a vacuum, a 70% ethanol solution was added thereto until the volume reached 1/250 of the capacity of the column, and this mixture was then charged in a silica gel 60N column (manufactured by Kanto Kagaku) and separated into fractions each having a volume equivalent to the capacity of the column by using a 70% ethanol solution as the eluant. The obtained fractions were evaporated to dryness in a vacuum and then dissolved in distilled water.

(7) Silica Gel Thin Layer Chromatography Treatment

The 70% ethanol-eluted fraction obtained from the above-mentioned silica gel column treatment was developed on a 2 mm plate of silica gel 60 (manufactured by Merck) using 70% ethanol as the developing liquid so as to separate/extract the ninhydrin-positive main spots.

Figure 6:
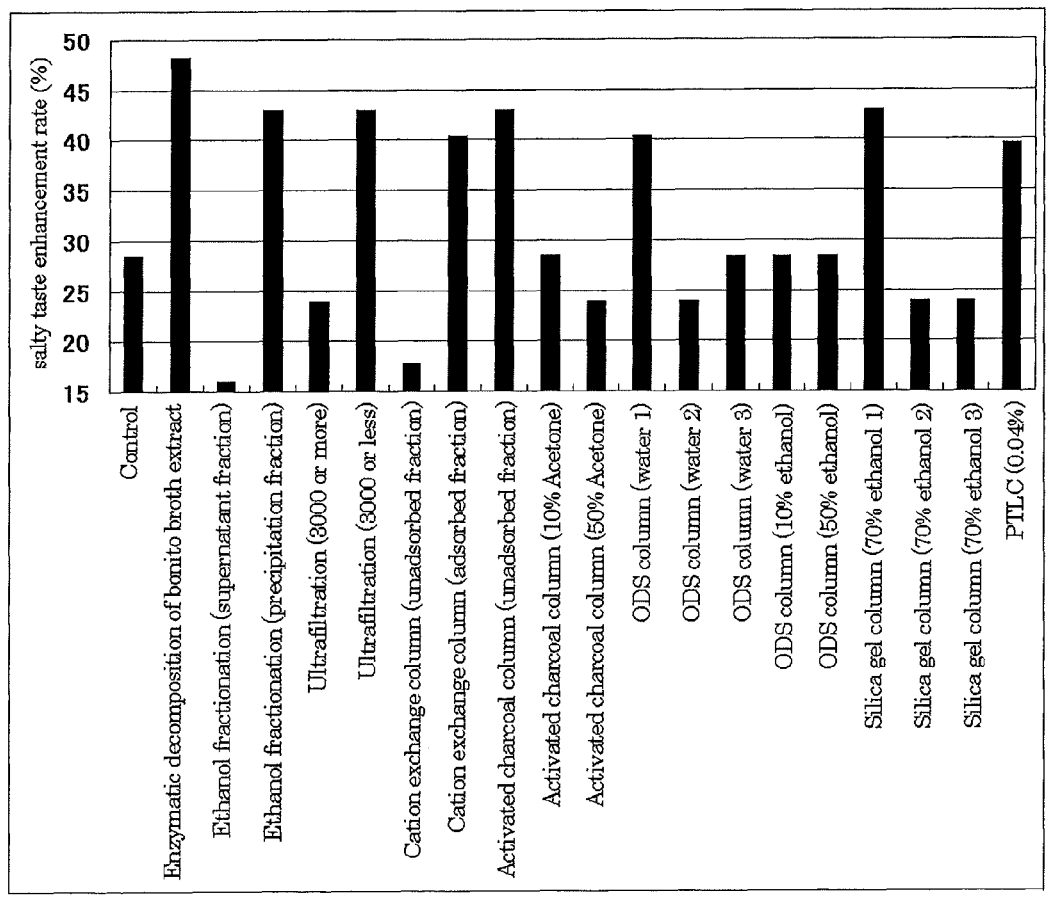
FIG. 6 shows the results of evaluations of the salty taste enhancement effects of a variety of concentrated products in Working Example 7.

FIG. 6 shows the results of the salty taste enhancement effect evaluations of the fractions subjected to the above-mentioned concentration treatments. It is understood that salty taste enhancement activity is maintained even if treatments used to concentrate the glutamic acid-containing dipeptides are carried out. By removing unwanted components, strange flavors and coarse flavors are eliminated, usability is improved in comparison to unconcentrated enzymatic decomposition products or proteins, and the added quantity of the enzymatic decomposition product of a protein can be reduced.

In addition, Table 3 shows the entire amino acid composition of the enzymatic decomposition product of the bonito broth extract and that of the concentrate obtained following the above-mentioned treatment (7). All the amino acid concentrations were obtained by acid hydrolysis, that is, treating the sample with a quantity of 6N HCl equivalent to 10 times the quantity of the sample for 24 hours at 110° C. and then measuring with a high speed amino acid analyzer (L-8900 manufactured by Hitachi High Technologies). It was understood that the glutamic acid-containing components had been concentrated.

TABLE 3

|  | enzymatic decomposition product of the bonito broth extract (%) | Concentrate of treatment (7) (%) |
|---|---|---|
| Ala | 8.3 | 9.2 |
| Arg | 6.1 | 0.0 |
| Asp | 5.4 | 14.0 |
| Glu | 10.0 | 48.8 |
| Gly | 16.5 | 3.1 |
| His | 10.4 | 0.0 |
| Ile | 1.5 | 0.0 |
| Leu | 3.2 | 0.0 |
| Lys | 4.5 | 0.0 |
| Met | 1.8 | 0.0 |
| Phe | 1.7 | 0.0 |
| Pro | 8.3 | 0.0 |
| Hypro | 5.9 | 0.0 |
| Ser | 3.0 | 2.0 |
| Thr | 2.9 | 14.2 |
| Tyr | 0.8 | 0.0 |
| Val | 2.8 | 7.4 |
| Tau | 2.6 | 0.5 |
| Others | 4.3 | 0.8 |
| Total | 100.0 | 100.0 |

INDUSTRIAL APPLICABILITY

According to the present invention, an excellent salty taste enhancer is provided, by which it is possible to compensate for insufficient salty taste when attempting to reduce salt content in a food and thereby to provide a variety of reduced salt foods having excellent taste.

The invention claimed is:

1. A method for enhancing a salty taste, comprising adding (a) a synthetic compound of a dipeptide selected from the group consisting of Glu-Ala, Glu-Arg, Glu-Asn, Glu-Asp, Glu-Gln, Glu-Glu, Glu-Gly, Glu-His, Glu-Ile, Glu-Pro, Glu-Ser, Glu-Thr, Glu-Trp, Glu-Val, Arg-Glu, Asp-Glu and His-Glu, and (b) at least one selected from the group consisting of an enzymatic decomposition product of a protein and a basic amino acid to a common salt-containing food or drink, wherein the synthetic compound of a dipeptide is added in an amount sufficient to enhance the salty taste of the common salt contained in the food or drink as compared to that of a food or drink in which the dipeptide is not added, and wherein each of Glu-Ala, Glu-Arg, Glu-Asn, Glu-Asp, Glu-Gln, Glu-Glu, Glu-Gly, Glu-His, Glu-Ile, Glu-Pro, Glu-Ser, Glu-Thr, Glu-Trp, Glu-Val, Arg-Glu, Asp-Glu and His-Glu has a sequence order from the carboxyl terminal end to the amino terminal end.

2. The method for enhancing a salty taste according to claim 1, wherein the dipeptide is selected from the group consisting of Glu-Ala, Glu-Arg, Glu-Asn, Glu-Asp, Glu-Gln, Glu-Glu, Glu-Gly, Glu-His, Glu-Ile, Glu-Ser, Glu-Thr, Arg-Glu, and His-Glu.

3. The method for enhancing a salty taste according to claim 1, wherein the dipeptide is selected from the group consisting of Glu-Ala, Glu-Gln, Glu-Glu, Glu-His and Glu-Thr.

4. The method for enhancing a salty taste according to claim 1, wherein the dipeptide is selected from the group consisting of Glu-Gln, Glu-Glu and Glu-Thr.

5. The method for enhancing a salty taste according to claim 1, wherein the basic amino acid is present and is arginine.

6. The method for enhancing a salty taste according to claim 1, wherein the enzymatic decomposition product of a protein is present and is an enzymatic decomposition product of a protein selected from the group consisting of proteins derived from meat or internal organs of mammals, birds, fish, shellfish, and grain- or soy-derived proteins.

7. The method for enhancing a salty taste according to claim 1, which further comprises adding potassium chloride.

8. A food or drink whose salty taste is enhanced by the method according to claim 1.

9. The food or drink according to claim 8, wherein a common salt content in the food or drink is lower than a common salt content in conventional foods or drinks.

* * * * *